(12) United States Patent
Itoh et al.

(10) Patent No.: US 9,643,283 B2
(45) Date of Patent: May 9, 2017

(54) ALUMINUM ALLOY BRAZING SHEET AND METHOD FOR PRODUCING THE SAME

(71) Applicants: Yasunaga Itoh, Tokyo (JP); Tomoki Yamayoshi, Tokyo (JP)

(72) Inventors: Yasunaga Itoh, Tokyo (JP); Tomoki Yamayoshi, Tokyo (JP)

(73) Assignee: UACJ CORPORATION, Chiyoda-ku, Tokyo (JP)

( * ) Notice: Subject to any disclaimer, the term of this patent is extended or adjusted under 35 U.S.C. 154(b) by 11 days.

(21) Appl. No.: 14/340,081

(22) Filed: Jul. 24, 2014

(65) Prior Publication Data
US 2015/0037607 A1 Feb. 5, 2015

(30) Foreign Application Priority Data

Jul. 31, 2013 (JP) ................................ 2013-159256

(51) Int. Cl.
*B32B 15/01* (2006.01)
*B23K 35/02* (2006.01)
(Continued)

(52) U.S. Cl.
CPC ............ *B23K 35/0238* (2013.01); *B23K 1/00* (2013.01); *B23K 1/0012* (2013.01); *B23K 1/20* (2013.01); *B23K 1/206* (2013.01); *B23K 35/00* (2013.01); *B23K 35/286* (2013.01); *B32B 15/016* (2013.01); *C22C 21/02* (2013.01);
(Continued)

(58) Field of Classification Search
None
See application file for complete search history.

(56) References Cited

U.S. PATENT DOCUMENTS 3,937,387 A * 2/1976 Fletcher ............ B23K 35/3613
228/193
5,971,258 A 10/1999 Eichhorn et al.
(Continued)

FOREIGN PATENT DOCUMENTS

JP 54-22939 B2 8/1979
JP 10-180489 A 7/1998
(Continued)

OTHER PUBLICATIONS

Search Report of European Patent Office issued in Application No. EP 14 00 2540 dated Nov. 26, 2015 (3 pages).

*Primary Examiner* — Daniel J Schleis
(74) *Attorney, Agent, or Firm* — Flynn, Thiel, Boutell & Tanis, P.C.

(57) ABSTRACT

An aluminum alloy brazing sheet achieves a stable brazability equal to by brazing using a flux, even if an etching treatment is not performed on the brazing site. The aluminum alloy brazing sheet is used to braze aluminum in an inert gas atmosphere without using a flux and includes a core material and a filler metal, one side or each side of the core material being clad with the filler metal, the core material being formed of an aluminum alloy that includes 0.2 to 1.3 mass % of Mg, the filler metal including 6 to 13 mass % of Si and 0.004 to 0.1 mass % of Li, with the balance being aluminum and unavoidable impurities, a surface oxide film having been removed from the brazing sheet, and an oil solution that decomposes when heated at 380° C. or less in an inert gas having been applied to the brazing sheet.

10 Claims, 3 Drawing Sheets

(51) Int. Cl.

| | |
|---|---|
| *B23K 35/28* | (2006.01) |
| *C22C 21/06* | (2006.01) |
| *C22C 21/02* | (2006.01) |
| *B23K 35/00* | (2006.01) |
| *B23K 1/00* | (2006.01) |
| *B23K 1/20* | (2006.01) |
| *F28F 21/08* | (2006.01) |
| *B23K 35/38* | (2006.01) |
| *B23K 101/14* | (2006.01) |

(52) U.S. Cl.
CPC ............ *C22C 21/06* (2013.01); *F28F 21/084* (2013.01); *F28F 21/089* (2013.01); *B23K 35/38* (2013.01); *B23K 2201/14* (2013.01); *Y10T 428/12764* (2015.01)

(56) References Cited

U.S. PATENT DOCUMENTS

| | | |
|---|---|---|
| 6,076,727 A | 6/2000 | Evans et al. |
| 6,199,750 B1 | 3/2001 | Kouno et al. |
| 2004/0035910 A1 | 2/2004 | Dockus et al. |
| 2011/0111254 A1* | 5/2011 | Wittebrood .......... B23K 35/002 428/654 |

FOREIGN PATENT DOCUMENTS

| | | |
|---|---|---|
| JP | 11-285817 A | 10/1999 |
| JP | 2000-317674 A | 11/2000 |
| JP | 2000317674 * | 11/2000 |
| JP | 2013-123749 A | 6/2013 |
| JP | 2013-233552 A | 11/2013 |

* cited by examiner

ALUMINUM ALLOY BRAZING SHEET AND METHOD FOR PRODUCING THE SAME

TECHNICAL FIELD

The invention relates to an aluminum alloy brazing sheet and a method for producing the same.

BACKGROUND OF THE INVENTION

A brazing method has been widely used as a method for joining parts having a large number of small joints (e.g., aluminum heat exchanger and machine parts). When brazing aluminum (including an aluminum alloy), it is indispensable to break the oxide film that covers the surface of the material so that the molten filler metal comes in contact with the matrix or another molten filler metal. The oxide film may be broken by utilizing a method that utilizes flux or a vacuum heating method. These methods have been put to practical use.

The brazing method has been applied to various fields. The brazing method has been most typically applied to automotive heat exchangers. Most automotive heat exchangers (e.g., radiator, heater, condenser, and evaporator) are made of aluminum, and produced by applying the brazing method. A method that applies a non-corrosive flux to the material, followed by heating in nitrogen gas is most widely used at present.

In recent years, a heat exchanger provided with electronic parts (e.g., inverter cooler) has been used along with a change in driveline (e.g., electric car and hybrid car), and a flux residue has posed problems. Therefore, some of the inverter coolers are produced using a vacuum brazing method that does not utilize flux. However, since the vacuum brazing method utilizes a heating furnace that increases the equipment and maintenance costs, and has problems as to productivity and brazing stability, a brazing method that is implemented in a nitrogen gas furnace without using flux has been increasingly desired.

For example, a method that utilizes a brazing sheet that is clad with a filler metal to which a small amount of Be is added, and performs an etching treatment in an acid or an alkali, followed by heating for brazing was put to practical use. However, the application range of this method was limited, and this method is rarely used at present. The application range of this method was limited for the following reasons.
(1) Since brazability is poor as compared with the method that applies a flux, a brazing failure easily occurs.
(2) A toxic element (i.e., Be) is included in the filler metal, even in a small amount.

The problem (1) is a fundamental problem. For example, even if easy brazing (e.g., brazing a fin and a tube) can be performed without a problem, it may be difficult to reliably braze an area where it is necessary to prevent leakage (e.g., an area in which a tube is inserted into a header, or a joint at the outer circumference of a hollow heat exchanger formed using a pressed sheet). Therefore, the application range is limited to a heat exchanger that can be easily brazed (e.g., a stacked-type heat exchanger that is mainly brazed in a plane, or a heat sink that is produced by brazing a fin to a base such as an extruded shape). The problem (2) (i.e., the toxicity of Be) is serious in the fields of food, medical equipment, and automotive heat exchangers, and the above method may generally be rejected for this reason.

In order to solve the above problems, the inventors of the invention proposed a brazing sheet in which a filler metal includes 0.004 to 0.1% of Li (see Japanese Patent Application No. 2012-105797). However, it was found through further studies that the surface oxide film must be removed from the brazing sheet by an etching treatment before heating for brazing in order to uniformly braze a heat exchanger having a complex joint structure.

Specifically, when producing a heat exchanger in which different joints are present at a short distance using a brazing method that utilizes a flux, the oxide film is broken and removed due to the flux, and a fillet is uniformly formed at each joint (i.e., the filler metal does not unevenly flow between the joints). However, the molten filler metal is drawn toward each joint when using a brazing method that does not utilize a flux. As a result, the molten filler metal is preferentially drawn in the direction in which a fillet is easily formed (i.e., the filler metal unevenly flows), and a brazing failure easily occurs at some joints.

Therefore, in order to implement a brazability equal to that achieved by brazing using flux when implementing brazing without using flux, it is necessary to remove the oxide film via an etching treatment before heating for brazing. However, since the etching treatment has a problem in connection with waste disposal, and waste management/disposal increases the cost, it is generally desired to avoid the etching treatment on the brazing site. This problem may be solved by shipping a material that has been subjected to the etching treatment on the material production site. However, the etching effects may be lost during storage, and a decrease in brazability may occur. (Japanese Patent No. 994051, JP-A-11-285817)

SUMMARY OF THE INVENTION

The invention was conceived as a result of clarifying a factor by which the effect of the etching treatment is lost, and finding a technique that can eliminate the factor in order to solve the above problem that occurs in connection with the etching treatment. An object of the invention is to provide an aluminum alloy brazing sheet that makes it possible to implement a stable brazability equal to that achieved by brazing using a flux, even if the etching treatment is not performed on the brazing site, and a method for producing the same.

The invention is summarized as follows.
(1) An aluminum alloy brazing sheet for brazing aluminum in an inert gas atmosphere without using flux, the brazing sheet including a core material and a filler metal, one side or each side of the core material being clad with the filler metal, the core material being formed of an aluminum alloy that includes 0.2 to 1.3 mass % (hereinafter may be referred to as "%") of Mg, with the balance being aluminum and unavoidable impurities, the filler metal including 6 to 13% of Si and 0.004 to 0.1% of Li, with the balance being aluminum and unavoidable impurities, a surface oxide film having been removed from the brazing sheet, and an oil solution that decomposes when heated at 380° C. or less in an inert gas having been applied to the brazing sheet.
(2) An aluminum alloy brazing sheet for brazing aluminum in an inert gas atmosphere without using flux, the brazing sheet including a core material formed of an aluminum alloy (including aluminum), a filler metal, and an intermediate material, one side or each side of the core material being clad with the filler metal through the intermediate material, the filler metal including 6 to 13% of Si and 0.004 to 0.1% of Li, with the balance being aluminum and unavoidable impurities, the intermediate material being formed of an aluminum alloy that includes 0.2 to 1.3% of Mg, with the balance being aluminum and unavoidable impurities, a surface oxide film having been removed from the brazing sheet, and an oil solution that decomposes when heated at 380° C. or less in an inert gas having been applied to the brazing sheet.

(3) An aluminum alloy brazing sheet for brazing aluminum in an inert gas atmosphere without using flux, the brazing sheet including a core material, a filler metal, and a sacrificial anode material, one side of the core material being clad with the filler metal, the other side of the core material being clad with the sacrificial anode material, the core material being formed of an aluminum alloy that includes 0.2 to 1.3% of Mg, with the balance being aluminum and unavoidable impurities, the filler metal including 6 to 13% of Si and 0.004 to 0.1% of Li, with the balance being aluminum and unavoidable impurities, the sacrificial anode material including 0.9 to 6% of Zn, with the balance being aluminum and unavoidable impurities, a surface oxide film having been removed from the brazing sheet, and an oil solution that decomposes when heated at 380° C. or less in an inert gas having been applied to the brazing sheet.

(4) An aluminum alloy brazing sheet for brazing aluminum in an inert gas atmosphere without using flux, the brazing sheet including a core material formed of an aluminum alloy or aluminum, a filler metal, an intermediate material, and a sacrificial anode material, one side of the core material being clad with the filler metal through the intermediate material, the other side of the core material being clad with the sacrificial anode material, the intermediate material being formed of an aluminum alloy that includes 0.2 to 1.3% of Mg, with the balance being aluminum and unavoidable impurities, the filler metal including 6 to 13% of Si and 0.004 to 0.1% of Li, with the balance being aluminum and unavoidable impurities, the sacrificial anode material including 0.9 to 6% of Zn, with the balance being aluminum and unavoidable impurities, a surface oxide film having been removed from the brazing sheet, and an oil solution that decomposes when heated at 380° C. or less in an inert gas having been applied to the brazing sheet.

(5) The aluminum alloy brazing sheet according to (1) or (3), wherein the aluminum alloy that forms the core material includes 0.2 to 1.3% of Mg, and one or more elements from among 0.5 to 1.8% of Mn, 1.0% or less of Si, 1.0% or less of Fe, 0.5% or less of Cu, 0.5% or less of Zn, 0.2% or less of Ti, and 0.5% or less of Zr, with the balance being aluminum and unavoidable impurities.

(6) The aluminum alloy brazing sheet according to (2) or (4), wherein the aluminum alloy that forms the intermediate material includes 0.2 to 1.3% of Mg, and one or more elements from among 0.5 to 1.8% of Mn, 1.0% or less of Si, 1.0% or less of Fe, 0.5% or less of Cu, 0.5% or less of Zn, 0.2% or less of Ti, and 0.5% or less of Zr, with the balance being aluminum and unavoidable impurities.

(7) The aluminum alloy brazing sheet according to (2) or (4), wherein the aluminum alloy that forms the core material includes 0.5 to 1.8% of Mn, and one or more elements from among 1.0% or less of Si, 1.0% or less of Fe, 0.5% or less of Cu, 0.5% or less of Zn, 0.2% or less of Ti, and 0.5% or less of Zr, with the balance being aluminum and unavoidable impurities.

(8) The aluminum alloy brazing sheet according to (6), wherein the aluminum alloy that forms the core material includes 0.5 to 1.8% of Mn, and one or more elements from among 1.0% or less of Si, 1.0% or less of Fe, 0.5% or less of Cu, 0.5% or less of Zn, 0.2% or less of Ti, and 0.5% or less of Zr, with the balance being aluminum and unavoidable impurities.

(9) The aluminum alloy brazing sheet according to (1) or (3), wherein the filler metal further includes one or more elements from among 0.004 to 0.2% of Bi, 0.05 to 0.4% of Mg, 0.002 to 0.05% of Sr, 0.003 to 0.07% of Sb, 0.05 to 0.8% of Fe, 0.05 to 0.2% of Mn, and 0.01 to 0.15% of Ti.

(10) The aluminum alloy brazing sheet according to (2) or (4), wherein the filler metal further includes one or more elements from among 0.004 to 0.2% of Bi, 0.05 to 0.4% of Mg, 0.002 to 0.05% of Sr, 0.003 to 0.07% of Sb, 0.05 to 0.8% of Fe, 0.05 to 0.2% of Mn, and 0.01 to 0.15% of Ti.

(11) The aluminum alloy brazing sheet according to (5), wherein the filler metal further includes one or more elements from among 0.004 to 0.2% of Bi, 0.05 to 0.4% of Mg, 0.002 to 0.05% of Sr, 0.003 to 0.07% of Sb, 0.05 to 0.8% of Fe, 0.05 to 0.2% of Mn, and 0.01 to 0.15% of Ti.

(12) The aluminum alloy brazing sheet according to (6), wherein the filler metal further includes one or more elements from among 0.004 to 0.2% of Bi, 0.05 to 0.4% of Mg, 0.002 to 0.05% of Sr, 0.003 to 0.07% of Sb, 0.05 to 0.8% of Fe, 0.05 to 0.2% of Mn, and 0.01 to 0.15% of Ti.

(13) The aluminum alloy brazing sheet according to (7), wherein the filler metal further includes one or more elements from among 0.004 to 0.2% of Bi, 0.05 to 0.4% of Mg, 0.002 to 0.05% of Sr, 0.003 to 0.07% of Sb, 0.05 to 0.8% of Fe, 0.05 to 0.2% of Mn, and 0.01 to 0.15% of Ti.

(14) The aluminum alloy brazing sheet according to (8), wherein the filler metal further includes one or more elements from among 0.004 to 0.2% of Bi, 0.05 to 0.4% of Mg, 0.002 to 0.05% of Sr, 0.003 to 0.07% of Sb, 0.05 to 0.8% of Fe, 0.05 to 0.2% of Mn, and 0.01 to 0.15% of Ti.

(15) A method for producing the aluminum alloy brazing sheet according to any one of (1) to (14), the method including cleaning a brazing sheet produced by rolling with an acid to remove a surface oxide film, and applying an oil solution that decomposes when heated at 380° C. or less in an inert gas to the brazing sheet.

(16) The method according to (15), wherein the cleaning with the acid etches a surface of the brazing sheet to a depth of 5 nm or more.

(17) The method according to (15) or (16), wherein the oil solution that decomposes when heated at 200 to 380° C. in an inert gas is applied to the brazing sheet in an amount of 500 mg/m$^2$ or more.

These aspects of the invention thus provide an aluminum alloy brazing sheet that makes it possible to implement a stable brazability equal to that achieved by brazing using a flux, even if an etching treatment is not performed on the brazing site, and a method for producing the same.

DESCRIPTION OF EMBODIMENTS

Figure 1:
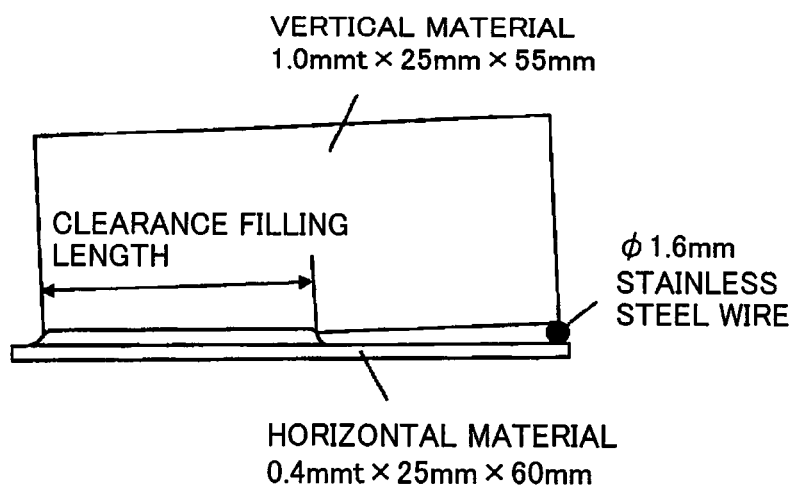
FIG. 1 is a view illustrating a clearance filling test specimen that utilizes a sheet material as a vertical material.

In order to implement brazing in an inert gas atmosphere without using a flux, it is necessary to implement (1) a function of promoting the breakage of an oxide film, and (2) a function of reducing the surface tension of a molten filler metal by means of a material. Opinions are divided on the mechanism by which the flux achieves the function (1). It is most likely that the molten flux enters cracks formed in the oxide film (i.e., cracks that occur due to the difference in thermal expansion from the matrix), and removes the oxide film from aluminum.

Molten flux can enter the cracks formed in the oxide film, and remove the oxide film from aluminum since the molten flux has a high wettability with the oxide film ($Al_2O_3$). The flux is used to remove an oxide when casting aluminum due to a high wettability with an oxide. When a small amount of Be is added to the filler metal, Be is diffused over the surface of the filler metal during heating for brazing, and forms BeO on the surface of the filler metal (confirmed by TEM observation). Since Be locally removes oxygen from $Al_2O_3$, the unity of the oxide film deteriorates, and cracks that occur due to the difference in thermal expansion from the matrix become fine. It is considered that the flow of the molten filler metal is thus promoted. An Al—Si filler metal to which about 0.01% of Be is added exhibits a wettability with an aluminum material even when a flux is not applied due to the above oxide film breakage function.

An element having a free energy of formation of oxides that is equal to or less than that of $Al_2O_3$ achieves the oxide film breakage function. Examples of a practical element other than Be include Mg, Ca, Ce, Zr, Sr, Ba, and the like. Since Mg has a special effect (described later), it is desirable to use Mg taking account of the special effect. The inventors proposed the use of Ca, Ce, and Zr (see Japanese Patent Application No. 2011-275285), and confirmed that a fillet is formed on a practical joint due to the combined effect with Mg. However, it was found that it is difficult to achieve a stable effect comparable to that of Be when brazing a joint with a high degree of difficulty in brazing. Sr has a low free energy of formation of oxides. However, Sr achieves the oxide film breakage effect to only a small extent when added alone.

In view of the above situation, the inventors focused on Li. The free energy of formation of $Li_2O$ at 600° C. is –970 kJ/mol, which is almost equal to that (–952 kJ/mol) of $Al_2O_3$. Since pure Li metal produces a combustible/flammable gas that may ignite upon contact with water, it is difficult to handle pure Li metal (e.g., it is necessary to immerse pure Li metal in oil during storage). Therefore, Li was excluded from candidates for an additional element. However, it was found that casting can be safely and easily performed by producing an intermediate alloy with aluminum using a special method. An Al—Si alloy and an Al—Li intermediate alloy were cast, and an Al—Si filler metal to which a small amount of Li was added was produced. A spreading test was performed using the resulting products. As a result, it was found that it is possible to obtain a wettability equal to or higher than that of an Al—Si filler metal to which a small amount of Be is added.

However, when Li is merely added to an Al—Si filler metal, a practical joining capability such as a clearance filling capability cannot be obtained in the same manner as in the case of adding Be. This is primarily because the function of a flux that removes an oxide film from aluminum cannot be achieved when Li or Be is added. It is physically difficult to achieve the function of removing an oxide film from aluminum by adding an element to the filler metal. However, it is possible to improve the brazability by forming an $Al_2MgO_4$ spinel-type compound in an $Al_2O_3$ oxide film so that the oxide film becomes fragile.

$Al_2MgO_4$ can be formed in the oxide film by adding Mg to the filler metal. However, it is preferable to add Mg to the core material or the intermediate material provided between the core material and the filler metal in order to prevent a situation in which MgO that impairs brazability is formed on the surface of the filler metal during material production and heating for brazing. When Mg is added to the core material or the intermediate material, Mg slowly diffuses inside the filler metal during heating for brazing, and rapidly diffuses toward the surface of the filler metal when the filler metal is melted (i.e., partial melting of an Al—Si—Mg ternary eutectic). Therefore, it is possible to form $Al_2MgO_4$ in the $Al_2O_3$ oxide film without forming MgO on the surface of the filler metal, and reliably cause the oxide film to become fragile.

Since Mg has an effect of reducing the surface tension of the molten filler metal (described later), it is effective to add Mg to the core material or the intermediate material in order to improve the fillet-forming capability when producing a practical joint. It is effective to reduce the surface tension of the molten Al—Si filler metal in order to reliably form a fillet on a practical joint having a clearance in a state in which the wettability of the molten filler metal is improved by breaking the oxide film (or removing the oxide film, or causing the oxide film to become fragile). It is also effective to add Bi in order to reduce the surface tension of the molten filler metal.

It is effective to improve the fluidity of the filler metal in order to further improve the fillet-forming capability without increasing the amount of the filler metal and the Si concentration in the filler metal. It is effective to reduce the particle size of Si in the Al—Si filler metal in order to improve the fluidity of the filler metal. The addition of Sr or Sb is a practical means. Na also has an effect of refining Si particles. However, since the handling of Na is very difficult, Na is not suitable for practical use.

When producing a heat exchanger by brazing, a molten filler metal may move downward due to the effects of gravity, and may not be sufficiently supplied to an upper joint. In particular, the effects of gravity cannot be disregarded when a joint requires a large amount of filler metal. It is effective to increase the viscosity of the molten filler metal in order to reduce the effects of gravity. Fe, Mn, and Ti are effective for increasing the viscosity of the molten filler metal. These elements and precipitates of compounds thereof increase the viscosity of the molten filler metal, and reduce the effects of gravity.

According to several embodiments of the invention, an aluminum alloy brazing sheet is used for brazing aluminum in an inert gas atmosphere without using a flux. The material configuration of the aluminum alloy brazing sheet is described below. In a first embodiment, the brazing sheet includes a core material and a filler metal, one side or each side of the core material being clad with the filler metal, the core material being formed of an aluminum alloy that includes 0.2 to 1.3% of Mg, and the filler metal including 6 to 13% of Si and 0.004 to 0.1% of Li, with the balance being aluminum and unavoidable impurities. In a second embodiment, the brazing sheet includes a core material formed of an aluminum alloy (including aluminum), a filler metal, and an intermediate material, one side or each side of the core material being clad with the filler metal through the intermediate material, the filler metal including 6 to 13% of Si and 0.004 to 0.1% of Li, with the balance being aluminum and unavoidable impurities, and the intermediate material being formed of an aluminum alloy that includes 0.2 to 1.3% of Mg.

The above Si content (6 to 13%) is a practical range for the filler metal. If the Si content is less than 6%, the filler metal may not achieve a sufficient function since the amount of the filler metal may be insufficient, and the fluidity of the filler metal may deteriorate. If the Si content exceeds 13%, the matrix may melt to a large extent due to excessive filler metal, and coarse primary Si crystals may be easily formed in the filler metal. As a result, a hole may be formed due to melting during brazing.

If the Li content is less than 0.004%, the effect of breaking the oxide film may be insufficient. If the Li content exceeds 0.1%, $Li_2O$ may be unnecessarily formed, and the brazability may deteriorate. If the Mg content in the core material and the intermediate material is less than 0.2%, the effect of breaking the oxide film may be insufficient. If the Mg content in the core material and the intermediate material exceeds 1.3%, the melting point of the core material and the intermediate material may decrease, and it may be difficult to implement brazing.

In a third embodiment, the brazing sheet includes the core material, the filler metal, and a sacrificial anode material, one side of the core material being clad with the filler metal, the other side of the core material being clad with the sacrificial anode material, and the sacrificial anode material including 0.9 to 6% of Zn, with the balance being aluminum and unavoidable impurities. If the Zn content in the sacrificial anode material is less than 0.9%, the sacrificial anode effect may be insufficient. If the Zn content in the sacrificial anode material exceeds 6%, the corrosion rate may increase, and the corrosion lifetime may decrease.

Bi and Mg have an effect of reducing the surface tension of the filler metal when added either alone or in combination. If the Bi content is less than 0.004%, the effect of reducing the surface tension of the filler metal may be insufficient. If the Bi content exceeds 0.2%, the filler metal may be significantly colored, and an improvement in brazability may not be achieved. If the Mg content is less than 0.05%, the effect of reducing the surface tension of the filler metal may be insufficient. If the Mg content exceeds 0.4%, MgO may be formed on the surface of the filler metal, and may impair brazability.

Sr and Sb have an effect of refining the Al—Si eutectic structure of the filler metal when added either alone or in combination. If the Sr content is less than 0.002%, the effect of refining the Al—Si eutectic structure of the filler metal may be insufficient. If the Sr content exceeds 0.05%, the effect of refining the Al—Si eutectic structure of the filler metal may be saturated, and the filler metal production cost may increase. If the Sb content is less than 0.003%, the effect of refining the Al—Si eutectic structure of the filler metal may be insufficient. If the Sb content exceeds 0.07%, the clearance filling capability may be adversely affected.

Fe, Mn, and Ti have an effect of increasing the viscosity of the molten filler metal when added either alone or in combination. The Fe content, the Mn content, and the Ti content are preferably 0.05 to 0.8%, 0.05 to 0.2%, and 0.01 to 0.15%, respectively. If the Fe content, the Mn content, or the Ti content is less than the lower limit, the effect of increasing the viscosity of the molten filler metal may be insufficient. If the Fe content, the Mn content, or the Ti content exceeds the upper limit, the fluidity of the molten filler metal may be adversely affected.

The core material and the intermediate material that include 0.2 to 1.3% of Mg may include one or more elements from among Mn, Si, Fe, Cu, Zn, Ti, and Zr in order to control the strength, the corrosion resistance, the structure, and the like of the core material and the intermediate material. Mn is effective for improving the strength and adjusting the potential of the material. If the Mn content is less than 0.5%, the effect of improving the strength of the material may be insufficient. If the Mn content exceeds 1.8%, cracks may easily occur when rolling the material. Si is effective for improving the strength of the material. If the Si content exceeds 1.0%, the melting point of the material may decrease, and the brazability may be adversely affected. Fe is effective for improving the strength of the material. If the Fe content exceeds 1.0%, the corrosion resistance of the material may be adversely affected, and coarse precipitates may be easily produced.

Cu is effective for improving the strength and adjusting the potential of the material. If the Cu content exceeds 0.5%, intergranular corrosion may easily occur, and the melting point of the material may decrease. Zn is effective for adjusting the potential of the material. If the Zn content exceeds 0.5%, the natural electrode potential may decrease to a large extent, and the corrosion perforation lifetime may decrease. Ti is effective for causing corrosion to proceed in layers. If the Ti content exceeds 0.2%, coarse precipitates may be easily produced. Zr is effective for increasing the crystal grain size of the material. If the Zr content exceeds 0.5%, cracks may easily occur when producing the material.

In the brazing sheet according to the second embodiment, aluminum or an aluminum alloy may be used as the core material. When using an aluminum alloy as the core material, it is preferable that the aluminum alloy include 0.5 to 1.8% of Mn, and one or more elements from among 1.0% or less of Si, 1.0% or less of Fe, 0.5% or less of Cu, 0.5% or less of Zn, 0.2% or less of Ti, and 0.5% or less of Zr, with the balance being aluminum and unavoidable impurities. Mn is effective for improving the strength and adjusting the potential of the material. If the Mn content is less than 0.5%, the effect of improving the strength of the material may be insufficient. If the Mn content exceeds 1.8%, cracks may easily occur when rolling the material. Si is effective for improving the strength of the material. If the Si content exceeds 1.0%, the melting point of the material may decrease, and the brazability may be adversely affected. Fe is effective for improving the strength of the material. If the Fe content exceeds 1.0%, the corrosion resistance of the material may be adversely affected, and coarse precipitates may be easily produced.

Cu is effective for improving the strength and adjusting the potential of the material. If the Cu content exceeds 0.5%, intergranular corrosion may easily occur, and the melting point of the material may decrease. Zn is effective for adjusting the potential of the material. If the Zn content exceeds 0.5%, the natural electrode potential may decrease to a large extent, and the corrosion perforation lifetime may decrease. Ti is effective for causing corrosion to proceed in layers. If the Ti content exceeds 0.2%, coarse precipitates may be easily produced. Zr is effective for increasing the crystal grain size of the material. If the Zr content exceeds 0.5%, cracks may easily occur when producing the material.

The details of removal of the surface oxide film by etching, and application of the oil solution that decomposes when heated at 380° C. or less in an inert gas, are described below. The etching treatment breaks and removes the oxide film on the surface of the filler metal. However, a natural oxide film is formed on the surface of the filler metal immediately after etching. Since the natural oxide film formed at room temperature has a small thickness, and easily breaks due to thermal expansion of the material during brazing, it is possible to implement brazing in an inert gas without using flux by utilizing a filler metal that includes Li.

An acid solution or an alkali solution is normally used for the etching treatment, and has an effect of removing the oxide film on the surface of the filler metal. It was found that a material washed with an alkaline solution (e.g., caustic soda) shows a poor fluxless brazability in nitrogen gas as compared with a material washed with an acid. It is conjectured that aluminum hydroxide or sodium aluminate produced due to alkali washing decomposes during heating for brazing to release water.

A material subjected to the etching treatment using an acid (e.g., a diluted solution of hydrofluoric acid, a mixed diluted solution of hydrofluoric acid and nitric acid, or a mixed diluted solution of phosphoric acid and sulfuric acid) exhibits an excellent brazability. It was found from the analysis results for the test specimen that exhibited an excellent brazability that the surface of the filler metal including the oxide film was etched to a depth of 5 to 200 nm by the etching treatment using an acid. It was also found that the brazability is not affected even if the etching depth exceeds 200 nm.

The etching effects may be lost during the storage period due to moisture in the air. An oxide film may grow when the material is stored for a long time at a high temperature and a high humidity. In order to determine a deterioration in the etching effects due to the growth of an oxide film during the storage period, a brazing sheet (horizontal material) including a filler metal formed of an Al-10% Si-0.05% Li-0.004% Bi alloy (thickness: 40 μm), and a core material formed of an Al-0.62% Mg alloy, and a 3003 alloy material (vertical material) were degreased, immersed in an etching solution treatment solution (2% nitric acid and 1% hydrofluoric acid) 20° C. for 90 seconds, and stored in a thermo-hygrostat (temperature: 50° C., humidity: 85%) up to 2 weeks. A storage period of 2 weeks under the above conditions corresponds to a storage period of about 2 years under normal conditions.

Figure 2:
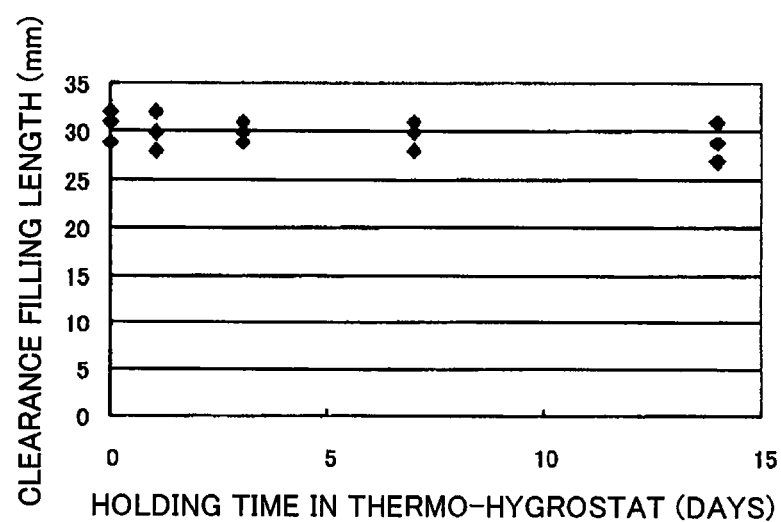
FIG. 2 is a view illustrating the relationship between the holding time in a thermo-hygrostat and the clearance filling length.

The clearance filling test specimen illustrated in FIG. 1 was prepared using the material that was stored in the thermo-hygrostat for 1 day, 3 days, 7 days, or 14 days, or the material immediately after the etching treatment, and brazed at a maximum temperature of 595° C. in a nitrogen gas atmosphere. FIG. 2 shows the relationship between the holding time in the thermo-hygrostat and the clearance filling length. As shown in FIG. 2, almost no decrease in the clearance filling length was observed even when the material was stored in the thermo-hygrostat for 2 weeks.

Figure 3:
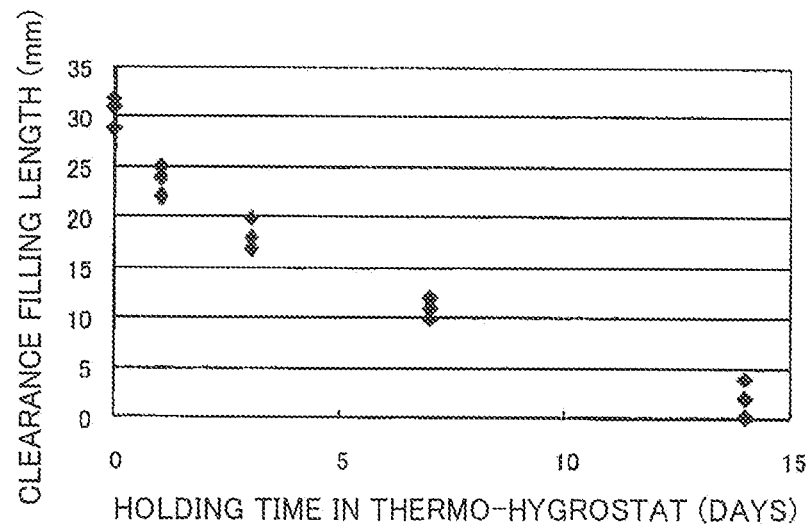
FIG. 3 is a view illustrating the relationship between the holding time in a thermo-hygrostat and the clearance filling length when dew condensation was caused to occur once a day.

The materials that were subjected to the etching treatment under the above conditions, and cooled to −10° C. in a freezer were placed in a thermo-hygrostat, removed from the thermo-hygrostat every day, cooled to −10° C. in the freezer, and returned to the thermo-hygrostat (i.e., dew condensation was caused to occur once a day). An evaluation test was then performed in the same manner as described above. The results are shown in FIG. 3. As shown in FIG. 3, the clearance filling length decreased after 1 day due to dew condensation, and brazability deteriorated after 2 weeks to such an extent that almost no fillet was formed. A spot pattern appeared on the surface of the material, and production of Al(OH)$_3$ (aluminum hydroxide) was confirmed by chemical analysis. Since Al(OH)$_3$ changes into Al$_2$O$_3$ during heating for brazing to release water, reoxidation of the surface of the filler metal is promoted, and brazability deteriorates. Therefore, it is necessary to prevent dew condensation on the surface of the material during the storage period.

Dew condensation can be prevented by air-tightly storing the material. However, since the material is frequently unpacked depending on the usage state, it is not realistic to prevent dew condensation by air-tightly storing the material. The surface of the material may be protected so that water droplets do not adhere to the surface of the material even in a dew condensation environment. The surface of the material may be protected by painting using an oily or water-soluble paint, application of a protective sheet, application of an oil solution, or the like. It was considered to be most effective to find an oil solution that prevents dew condensation during the storage period, and decomposes during heating for brazing (i.e., does not cause a deterioration in brazability).

The oil solution is required to have a moderate volatility (i.e., prevent dew condensation during the storage period), and decompose during heating so that the brazability is not impaired. It was found that the above requirements are met when the oil solution decomposes when heated at 200 to 380° C. in an inert gas. It was also found that the oil solution can maintain the effects during storage for a long time or storage in a severe environment when the oil solution is applied in an amount of 500 mg/m$^2$ or more.

It is possible to make it unnecessary to perform the etching treatment in the brazing site by subjecting the surface of the brazing sheet to the etching treatment in the final stage (rolling) of the production of the brazing sheet, and applying the oil solution so that the etching effects can be maintained. The etching treatment using an alkali solution is not desirable since aluminum hydroxide or the like produced during the etching treatment decomposes during heating for brazing to release water. The oil solution must decompose during heating for brazing in an inert gas so that the brazability is not adversely affected even if a special degreasing treatment is not performed. A highly volatile oil solution may be used when the material is brazed shortly after production, or when the material is air-tightly stored, and used immediately after unpacking.

If the etching depth of the surface of the filler metal including the surface oxide film is less than 5 nm, the etching effects may deteriorate. A highly volatile oil solution (i.e., an oil solution that decomposes when heated at less than 200° C. in an inert gas) may not sufficiently maintain the etching effects when the material is brazed when a long time has elapsed after production, or when the material is stored in an insufficient air-tight state in an environment in which a change in temperature within one day is large, or when the material is frequently unpacked in a high-humidity environment, and used intermittently. If an oil solution that decomposes when heated at 200° C. or more in an inert gas is applied in an amount of less than 500 mg/m$^2$, the oil solution may not sufficiently maintain the etching effects during storage for a long time or storage in a severe environment.

EXAMPLES

The invention is further described below by way of examples to demonstrate the effects of the invention. Note that the following examples are for illustration purposes only, and the invention is not limited to the following examples.

Example 1

A core material was produced by casting an ingot using a continuous casting method, and facing the ingot to a given thickness. A filler metal, an intermediate material, and a sacrificial anode material were produced by casting an ingot using a continuous casting method, and hot-rolling the ingot to a given thickness. The filler metal was stacked on one side of the core material, followed by hot rolling and cold rolling, or the filler metal was stacked on one side of the core material through the intermediate material, followed by hot rolling and cold rolling, or the filler metal was stacked on one side of the core material through the intermediate material, and the sacrificial anode material was stacked on the other side of the core material, followed by hot rolling and cold rolling to produce an aluminum alloy brazing sheet having a thickness of 0.4 mm. The composition of the core material, the filler metal, the intermediate material, and the sacrificial anode material is shown in Table 1.

The resulting aluminum alloy brazing sheet (specimens 1 to 25) was subjected to a clearance filling test and a cup test according to the following methods. The results are shown in Table 1.

Clearance Filling Test

The brazing sheet was degreased, and immersed for 90 seconds in a mixed dilution solution (2% nitric acid and 1% fluoric acid, 20° C.) (etching treatment). A 3003 alloy sheet (thickness: 1 mm) (vertical material) was assembled with the brazing sheet (horizontal material) to prepare a clearance filling test specimen illustrated in FIG. 1. A nitrogen gas furnace (double chamber furnace) including a preheating chamber (internal volume: 0.4 m$^3$) and a brazing chamber was used. The clearance filling test specimen was placed in the brazing chamber, and brazed at a maximum temperature of 595° C. Nitrogen gas was fed to each chamber of the nitrogen gas furnace at a flow rate of 20 m$^3$/h, and the temperature was increased from 450° C. to 595° C. within about 12 minutes. The oxygen concentration in the brazing chamber after completion of heating was 7 to 17 ppm. When the temperature of the clearance filling test specimen placed in the brazing chamber reached 595° C., the clearance filling test specimen was transferred to the preheating chamber, cooled to 550° C., removed from the preheating chamber, and allowed to cool in air.

Cup Test

Figure 4:
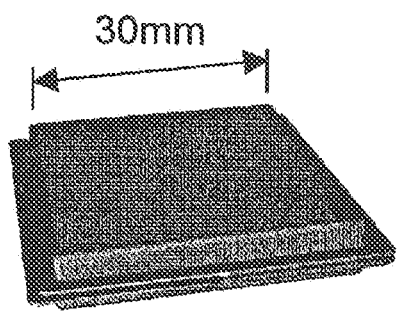
FIG. 4 is a view illustrating the external appearance of a cup test specimen.
Figure 5:
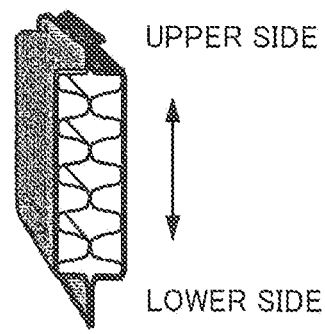
FIG. 5 is a view illustrating the state of a cup test specimen during brazing.

The brazing sheets were pressed so that the filler metal was positioned on the inner side, degreased, and subjected to an etching treatment in the same manner as described above. A 3003 alloy material (thickness: 0.1 mm) that was formed in the shape of a fin and degreased, was placed therein to prepare a cup test specimen illustrated in FIG. 4. The cup test specimen was heated during brazing in the state illustrated in FIG. 5 in order to simulate the adverse effects of gravity. The cup test specimen was placed in the same furnace as that used for the clearance filling test. Nitrogen gas was fed to each chamber at a flow rate of 20 m$^3$/h, and the temperature was increased from 450° C. to 595° C. within about 14 minutes. The oxygen concentration in the brazing chamber after completion of heating was 6 to 15 ppm. When the temperature of the cup test specimen placed in the brazing chamber reached 595° C., the cup test specimen was transferred to the preheating chamber, cooled to 550° C., removed from the preheating chamber, and allowed to cool in air.

The clearance filling length of the clearance filling test specimen was measured after brazing to evaluate the fillet-forming capability. A case where the clearance filling length was 25 mm or more was evaluated as "Acceptable" (practical level). The flow factor was calculated by the following expression.

Flow factor $K$=volume of fillet formed/volume of filler metal of horizontal material A fillet on the upper side of the outer circumference of the cup test specimen was observed with the naked eye and using a stereoscopic microscope, and evaluated as described below.

A: A uniform fillet was formed over the total length.
B: A fillet was formed over the total length, but was rather small.
C: A fillet was formed over the total length, but broke in part.
D: A fillet broke at a plurality points.
E: A fillet was not formed.

TABLE 1

| Specimen | Material | Si | Fe | Mn | Mg | Zn | Ti | Li | Bi | Sr | Sb | Thickness (μm) | Flow factor K | Clearance filling length (mm) | Brazing state on upper side of cup |
|---|---|---|---|---|---|---|---|---|---|---|---|---|---|---|---|
| 1 | Filler metal | 10 | | | | | | 0.004 | | | | 60 | 0.45 | 28 | C to B |
| | Core material | | | 1.2 | 1.29 | | | | | | | 340 | | | |
| 2 | Filler metal | 10 | | | | | | 0.05 | | | | 60 | 0.47 | 29 | C to B |
| | Core material | | | 1.2 | 0.20 | | | | | | | 340 | | | |
| 3 | Filler metal | 10 | | | | | | 0.10 | | | | 60 | 0.49 | 31 | C to B |
| | Core material | | | 1.2 | 0.62 | | | | | | | 340 | | | |
| 4 | Filler metal | 10 | | | | | | 0.004 | | | | 60 | 0.44 | 27 | C to B |
| | Intermediate material | | | | 1.29 | | | | | | | 50 | | | |
| | Core material | | | 1.2 | | | | | | | | 290 | | | |
| 5 | Filler metal | 10 | | | | | | 0.004 | | | | 60 | 0.44 | 26 | C to B |
| | Intermediate material | | | | 0.20 | | | | | | | 50 | | | |
| | Core material | | | | | | | | | | | 290 | | | |
| 6 | Filler metal | 10 | | | | | | 0.004 | | | | 60 | 0.45 | 28 | C to B |
| | Intermediate material | | | | 0.62 | | | | | | | 50 | | | |
| | Core material | | | | | | | | | | | 290 | | | |
| 7 | Filler metal | 10 | | | | | | 0.05 | | | | 60 | 0.48 | 30 | B |
| | Intermediate material | | | | 0.62 | | | | | | | 50 | | | |

TABLE 1-continued

| Specimen | Material | Component (mass %) | | | | | | | | | | Thickness (μm) | Flow factor K | Clearance filling length (mm) | Brazing state on upper side of cup |
|---|---|---|---|---|---|---|---|---|---|---|---|---|---|---|---|
| | | Si | Fe | Mn | Mg | Zn | Ti | Li | Bi | Sr | Sb | | | | |
| | Core material | | | | | | | | | | | 240 | | | |
| | Sacrificial anode material | | | | 0.9 | | | | | | | 50 | | | |
| 8 | Filler metal | 10 | | | | | | 0.05 | | | | 60 | 0.44 | 29 | B |
| | Intermediate material | | | | 0.62 | | | | | | | 50 | | | |
| | Core material | | | | | | | | | | | 240 | | | |
| | Sacrificial anode material | | | | 6.0 | | | | | | | 50 | | | |
| 9 | Filler metal | 10 | | | | | | 0.05 | 0.004 | | | 60 | 0.47 | 32 | B |
| | Core material | | | | 0.62 | | | | | | | 340 | | | |
| 10 | Filler metal | 10 | | | | | | 0.05 | 0.2 | | | 60 | 0.48 | 33 | B |
| | Core material | | | | 0.62 | | | | | | | 340 | | | |
| 11 | Filler metal | 10 | | | 0.05 | | | 0.05 | | | | 60 | 0.47 | 33 | B |
| | Core material | | | | 0.62 | | | | | | | 340 | | | |
| 12 | Filler metal | 10 | | | 0.41 | | | 0.05 | | | | 60 | 0.47 | 33 | B |
| | Core material | | | | 0.62 | | | | | | | 340 | | | |
| 13 | Filler metal | 10 | | | 0.15 | | | 0.05 | 0.03 | | | 60 | 0.48 | 34 | B |
| | Core material | | | | 0.62 | | | | | | | 340 | | | |
| | Core material | | | | 0.62 | | | | | | | 340 | | | |
| 14 | Filler metal | 10 | | | | | | 0.05 | 0.03 | 0.002 | | 60 | 0.51 | 36 | B |
| | Core material | | | | 0.62 | | | | | | | 340 | | | |
| 15 | Filler metal | 10 | | | | | | 0.05 | 0.03 | 0.05 | | 60 | 0.52 | 36 | B |
| | Core material | | | | 0.62 | | | | | | | 340 | | | |
| 16 | Filler metal | 10 | | | | | | 0.05 | 0.03 | | 0.003 | 60 | 0.51 | 35 | B |
| | Core material | | | | 0.62 | | | | | | | 340 | | | |
| 17 | Filler metal | 10 | | | | | | 0.05 | 0.03 | | 0.07 | 60 | 0.5 | 35 | B |
| | Core material | | | | 0.62 | | | | | | | 340 | | | |
| 18 | Filler metal | 10 | | | | | | 0.05 | 0.03 | 0.006 | 0.009 | 60 | 0.53 | 37 | B |
| | Core material | | | | 0.62 | | | | | | | 340 | | | |
| 19 | Filler metal | 10 | 0.05 | | | | | 0.05 | 0.03 | 0.006 | 0.009 | 60 | 0.52 | 35 | A |
| | Core material | | | | 0.62 | | | | | | | 340 | | | |
| 20 | Filler metal | 10 | 0.8 | | | | | 0.05 | 0.03 | 0.006 | 0.009 | 60 | 0.51 | 34 | A |
| | Core material | | | | 0.62 | | | | | | | 340 | | | |
| 21 | Filler metal | 10 | | 0.05 | | | | 0.05 | 0.03 | 0.006 | 0.009 | 60 | 0.52 | 34 | A |
| | Core material | | | | 0.62 | | | | | | | 340 | | | |
| 22 | Filler metal | 10 | | 0.19 | | | | 0.05 | 0.03 | 0.006 | 0.009 | 60 | 0.52 | 33 | A |
| | Core material | | | | 0.62 | | | | | | | 340 | | | |
| 23 | Filler metal | 10 | | | | 0.01 | | 0.05 | 0.03 | 0.006 | 0.009 | 60 | 0.53 | 34 | A |
| | Core material | | | | 0.62 | | | | | | | 340 | | | |
| 24 | Filler metal | 10 | | | | 0.15 | | 0.05 | 0.03 | 0.006 | 0.009 | 60 | 0.52 | 34 | A |
| | Core material | | | | 0.62 | | | | | | | 340 | | | |
| 25 | Filler metal | 10 | 0.4 | 0.09 | | 0.05 | | 0.05 | 0.03 | 0.006 | 0.009 | 60 | 0.52 | 33 | A |
| | Core material | | | | 0.62 | | | | | | | 340 | | | |

As shown in Table 1, when using the brazing sheets 1 to 25 according to the invention, a fillet having a clearance filling length of 26 to 37 mm was formed in the clearance filling test (i.e., the brazing sheets 1 to 25 showed a sufficiently practical fillet-forming capability).

The clearance filling length reached the practical level when Li was added to the filler metal, and Mg was added to the core material (specimens 1 to 3). A similar effect was observed when Mg (that has an effect of causing the oxide film to become fragile) was added to the intermediate material (specimens 4 to 8). A similar effect was also observed when one side of the core material was clad with the sacrificial anode material (specimens 7 and 8).

When Bi or Mg was added to the filler metal, the flow factor increased to only a small extent, but the clearance filling length increased by about 10%, and a fillet was sufficiently formed on the upper side of the outer circumference of the cup test specimen. It is considered that the above results were obtained since the surface tension of the molten filler metal decreased due to the addition of Bi or Mg (specimens 9 to 13). When Sr or Sb was added to the filler metal, the flow factor increased by 5 to 10%, and the clearance filling length also increased (specimens 14 to 18). When Fe, Mn, or Ti was added to the filler metal, a fillet was uniformly formed on the upper side of the outer circumference of the cup test specimen. It is considered that the above results were obtained since the effects of gravity were canceled due to an increase in the viscosity of the molten filler metal (specimens 19 to 25).

Comparative Example 1

A core material was produced by casting an ingot using a continuous casting method, and facing the ingot to a given thickness. A filler metal was produced by casting an ingot using a continuous casting method, and hot-rolling the ingot to a given thickness. The filler metal was stacked on one side of the core material, followed by hot rolling and cold rolling to produce an aluminum alloy brazing sheet having a thickness of 0.4 mm. The composition of the core material and the filler metal is shown in Table 2.

The resulting aluminum alloy brazing sheet (specimens 26 to 45) was subjected to the gap filling test and the cup test in the same manner as in Example 1. The results are shown in Table 2.

TABLE 2

| Specimen | Material | Si | Fe | Mn | Mg | Zn | Ti | Li | Bi | Sr | Sb | Be | Thickness (μm) | Flow factor K | Clearance filling length (mm) | Brazing state on upper side of cup |
|---|---|---|---|---|---|---|---|---|---|---|---|---|---|---|---|---|
| 26 | Filler metal | 10 | | | | | | | | | | | 60 | — | 6 | E |
|  | Core material | | | 1.2 | | | | | | | | | 340 | | | |
| 27 | Filler metal | 10 | | | | | | 0.05 | | | | | 60 | 0.31 | 22 | C |
|  | Core material | | | 1.2 | | | | | | | | | 340 | | | |
| 28 | Filler metal | 10 | | | | | | | | | | | 60 | 0.28 | 20 | D |
|  | Core material | | | 1.2 | 0.62 | | | | | | | | 340 | | | |
| 29 | Filler metal | 10 | | | 0.20 | | | | | | | | 60 | 0.27 | 18 | D |
|  | Core material | | | 1.2 | | | | | | | | | 340 | | | |
| 30 | Filler metal | 10 | | | | | | | 0.02 | | | 0.01 | 60 | 0.39 | 25 | C |
|  | Core material | | | 1.2 | | | | | | | | | 340 | | | |
| 31 | Filler metal | 10 | | | | | | | 0.02 | | | 0.01 | 60 | 0.45 | 29 | C to B |
|  | Core material | | | 1.2 | 0.62 | | | | | | | | 340 | | | |
| 32 | Filler metal | 10 | | | | | | 0.002 | | | | | 60 | 0.29 | 20 | D |
|  | Core material | | | 1.2 | 0.62 | | | | | | | | 340 | | | |
| 33 | Filler metal | 10 | | | | | | 0.16 | | | | | 60 | 0.37 | 24 | C |
|  | Core material | | | 1.2 | 0.62 | | | | | | | | 340 | | | |
| 34 | Filler metal | 10 | | | | | | 0.05 | | | | | 60 | 0.37 | 23 | C |
|  | Core material | | | 1.2 | 0.11 | | | | | | | | 340 | | | |
| 35 | Filler metal | 10 | | | | | | | 0.02 | | | | 60 | — | 11 | D |
|  | Core material | | | 1.2 | | | | | | | | | 340 | | | |
| 36 | Filler metal | 10 | | | | | | 0.004 | 0.002 | | | | 60 | 0.38 | 26 | C to B |
|  | Core material | | | | 0.62 | | | | | | | | 340 | | | |
| 37 | Filler metal | 10 | | | | | | 0.004 | 0.25 | | | | 60 | 0.36 | 24 | C |
|  | Core material | | | | 0.62 | | | | | | | | 340 | | | |
| 38 | Filler metal | 10 | | | 0.02 | | | 0.004 | | | | | 60 | 0.37 | 25 | C to B |
|  | Core material | | | | 0.62 | | | | | | | | 340 | | | |
| 39 | Filler metal | 10 | | | 0.61 | | | 0.004 | | | | | 60 | 0.35 | 23 | C |
|  | Core material | | | | 0.62 | | | | | | | | 340 | | | |
| 40 | Filler metal | 10 | | | | | | 0.004 | | 0.001 | | | 60 | 0.38 | 25 | C to B |
|  | Core material | | | | 0.62 | | | | | | | | 340 | | | |
| 41 | Filler metal | 10 | | | | | | 0.004 | | 0.07 | | | 60 | 0.51 | 35 | B |
|  | Core material | | | | 0.62 | | | | | | | | 340 | | | |
| 42 | Filler metal | 10 | | | | | | 0.004 | | | 0.001 | | 60 | 0.38 | 25 | C to B |
|  | Core material | | | | 0.62 | | | | | | | | 340 | | | |
| 43 | Filler metal | 10 | | | | | | 0.004 | | | 0.1 | | 60 | 0.33 | 22 | C |
|  | Core material | | | | 0.62 | | | | | | | | 340 | | | |
| 44 | Filler metal | 10 | 0.03 | 0.02 | | | 0.005 | 0.05 | 0.03 | 0.006 | 0.009 | | 60 | 0.52 | 36 | B |
|  | Core material | | | | 0.62 | | | | | | | | 340 | | | |
| 45 | Filler metal | 10 | 1.1 | 0.29 | | | 0.2 | 0.05 | 0.03 | 0.006 | 0.009 | | 60 | 0.41 | 27 | C to B |
|  | Core material | | | | 0.62 | | | | | | | | 340 | | | |

As shown in Table 2, when using the brazing sheet produced using an Al-10% Si alloy filler metal and an Al—Mn alloy core material, the clearance filling length was 6 mm (i.e., brazability significantly deteriorated), and almost no fillet was formed in the cup test (specimen 26). Brazability was improved when Li was added to the filler metal, or when Mg was added to the core material, or when Mg was added to the filler metal. In this case, however, the clearance filling length was 22 mm or less (i.e., the practical level was not reached) (specimens 27 to 29).

When using the brazing sheet (specimen 30) in which Bi and Be were added to the filler metal, and the brazing sheet (specimen 31) in which Bi and Be were added to the filler metal, and Mg was added to the core material, a clearance filling length of 25 mm or more was obtained. However, since the filler metal includes Be (i.e., a toxic element), these brazing sheets are not suitable for practical use.

When the Li content in the filler metal was low (specimen 32), or when the Li content in the filler metal was high (specimen 33), the clearance filling length was less than 25 mm. When the Mg content in the core material was low (specimen 34), the clearance filling length was less than 25 mm. When only Bi was added to the filler metal (specimen 35), the effect of breaking the oxide film was insufficient, and brazability was poor.

When Li and Bi were added to the filler metal, and Mg was added to the core material, an improvement in brazability was not observed when the Bi content was low (specimen 36), and brazability decreased to some extent, and significant coloration was observed when the Bi content was too high (specimen 37). When Li was added to the filler metal, and Mg was added to the core material, no effect was observed when the Mg content in the filler metal was low (specimen 38), and brazability decreased when the Mg content in the filler metal was too high (specimen 39).

When Li was added to the filler metal, and Mg was added to the core material, no effect was observed when the Sr content in the filler metal was low (specimen 40), and an improvement in brazability was not observed even when the Sr content in the filler metal was more than 0.05% (specimen 41). In this case, the material cost merely increases. When Li was added to the filler metal, and Mg was added to the core material, no effect was observed when the Sb content in the filler metal was low (specimen 42), and the brazability decreased when the Sb content in the filler metal was too high (specimen 43).

When Li, Bi, Sr, and Sb were added to the filler metal, and Mg was added to the core material, an improvement in brazability was not observed when the Fe content, the Mn content, and the Ti content in the filler metal were low (specimen 44 (as compared with specimen 18)), and the brazability decreased when the Fe content, the Mn content, and the Ti content in the filler metal were too high (specimen 45 (as compared with specimen 18)).

Example 2

The following test was performed in order to determine the effects of the etching solution and the etching depth. In order to uniformly forma fillet on each joint of a brazing target product in which a plurality of types of joints are present at a short distance, it is necessary to sufficiently break an oxide film on at least the surface of the filler metal so that formation of a fillet is not hindered. In the clearance filling test illustrated in FIG. 1 in which a fillet is formed at one position, physical breakage (mechanical breakage along with formation of a fillet) of the oxide film efficiently proceeds when forming a fillet due to the effects of surface tension and the like. Therefore, a fillet is easily formed uniformly (i.e., a fillet can be easily formed to have a length corresponding to the amount and the properties of the molten filler metal) even when the oxide film is insufficiently broken to some extent.

Figure 6:
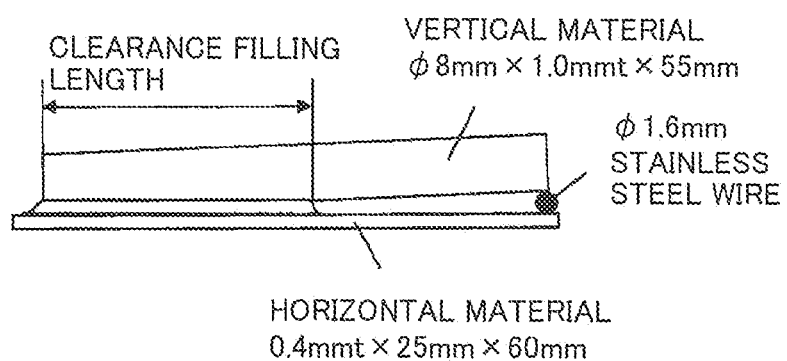
FIG. 6 is a view illustrating a clearance filling test specimen that utilizes a tube material as a vertical material.

In order to more strictly evaluate the fillet-forming capability, a two-dimensional clearance filling test that utilizes the clearance filling test specimen illustrated in FIG. 6 was performed. The clearance filling test specimen illustrated in FIG. 6 differs from the clearance filling test specimen illustrated in FIG. 1 in that the vertical material is replaced with a round tube. If the oxide film formed on the surface of the filler metal is not sufficiently broken in a planar manner (without anisotropy), formation of a fillet becomes non-uniform, and the clearance filling length decreases.

Two-dimensional clearance filling test: Specimen 19 (brazing sheet) that showed excellent results in the clearance filling test and the cup test in Example 1, and a 3003 alloy tube were degreased, and subjected to an etching treatment using a 5% NaOH solution (45° C. or 60° C.), a 1% hydrofluoric acid solution (20° C.), a 1% hydrofluoric acid+2% nitric acid solution (20° C. or 50° C.), or a 3% phosphoric acid+5% sulfuric acid solution (70° C.). The immersion time (5 to 300 seconds) was changed corresponding to the etching solution.

The etching depth of the brazing sheet was calculated from the GD-OES analysis results before and after the etching treatment. Specimen 19 (horizontal material) and the 3003 alloy tube (vertical material) were assembled to prepare the two-dimensional clearance filling test specimen illustrated in FIG. 6, and the clearance filling test specimen was brazed in the same manner as in Example 1. The results are shown in Table 3.

TABLE 3

| Specimen | Etching solution | Etching depth (nm) | Two-dimensional clearance filling length (mm) |
|---|---|---|---|
| 46 | 1% hydrofluoric acid | 6 | 27 |
| 47 | 1% hydrofluoric acid | 10 | 29 |
| 48 | 1% hydrofluoric acid | 120 | 32 |
| 49 | 1% hydrofluoric acid + 2% nitric acid | 5 | 27 |
| 50 | 1% hydrofluoric acid + 2% nitric acid | 8 | 28 |
| 51 | 1% hydrofluoric acid + 2% nitric acid | 100 | 31 |
| 52 | 1% hydrofluoric acid + 2% nitric acid | 500 | 30 |
| 53 | 3% phosphoric acid + 5% sulfuric acid | 9 | 26 |
| 54 | 3% phosphoric acid + 5% sulfuric acid | 70 | 29 |
| 55 | 3% phosphoric acid + 5% sulfuric acid | 110 | 28 |
| 56 | 1% hydrofluoric acid | 4 | 21 |
| 57 | 1% hydrofluoric acid + 2% nitric acid | 3 | 18 |
| 58 | 3% phosphoric acid + 5% sulfuric acid | 3 | 14 |
| 59 | 5% NaOH solution | 5 | 11 |
| 60 | 5% NaOH solution | 30 | 9 |
| 61 | 5% NaOH solution | 120 | 13 |

As shown in Table 3, an etching depth of 5 nm or more was obtained, and a stable fillet was formed when the etching treatment was performed using the acid solution (hydrofluoric acid solution, hydrofluoric acid+nitric acid solution, or phosphoric acid+sulfuric acid solution) (specimens 46 to 55). Even when the etching treatment was performed using the acid solution, the shape of the fillet was unstable, and the clearance filling length decreased when the etching depth was less than 5 nm (specimens 56 to 58). When the etching treatment was performed using the NaOH solution, the shape of the fillet was unstable, and the clearance filling length was short irrespective of the etching depth (specimens 59 to 61).

Example 3

Specimen 19 (brazing sheet) that showed excellent results in the clearance filling test and the cup test in Example 1, and a 3003 alloy tube were degreased, and immersed in a 1% hydrofluoric acid+2% nitric acid solution (20° C.) (etching treatment, depth: 100 nm). An oil solution that decomposes when heated at 120° C. (n-paraffin-based oil solution A), 200° C. (paraffin-based mineral oil solution B), 270° C. (polybutene-based oil solution C), 380° C. (naphthene-based mineral oil solution D), or 450° C. (silicone oil-based oil solution E) in an inert gas, was applied to specimen 19 (brazing sheet) in an amount of 300 mg/m$^2$, 500 mg/m$^2$, or 1400 mg/m$^2$.

Specimen 19 (brazing sheet) and the 3003 alloy tube were cooled to −10° C. in a freezer, placed in a thermo-hygrostat (temperature: 50° C., humidity: 85%), removed from the thermo-hygrostat every day, cooled to −10° C. in the freezer, and returned to the thermo-hygrostat (i.e., dew condensation was caused to occur once a day). A two-dimensional clearance filling test was then performed in the same manner as in Example 2. The results are shown in Table 4. In Table 4, "0 days" indicates the results obtained when the brazing test was performed directly after applying the oil solution.

A case where the clearance filling length was 25 mm or more was evaluated as "Acceptable" ("A" in Table 4), a case where the clearance filling length was 19 mm or more and less than 25 mm was evaluated as "Fair" ("B" in Table 4), and a case where the clearance filling length was less than 19 mm was evaluated as "Unacceptable" ("C" in Table 4).

TABLE 4

| Specimen | Oil solution | Decomposition temperature in inert gas (° C.) | Application amount (mg/m$^2$) | Two-dimensional clearance filling length after storage in thermo-hygrostat (with dew condensation) (mm) | | | | | Evaluation |
|---|---|---|---|---|---|---|---|---|---|
| | | | | 0 days | 1 day | 3 days | 7 days | 14 days | |
| 62 | A | 120 | 300 | 32 | 21 | 8 | 0 | 0 | A to C |
| 63 | A | 120 | 500 | 31 | 25 | 11 | 0 | 0 | A to C |
| 64 | A | 120 | 1400 | 31 | 26 | 17 | 6 | 0 | A to C |
| 65 | B | 200 | 300 | 31 | 24 | 19 | 15 | 11 | A to C |
| 66 | B | 200 | 500 | 32 | 31 | 31 | 28 | 27 | A |
| 67 | B | 200 | 1400 | 30 | 31 | 31 | 30 | 28 | A |
| 68 | C | 270 | 300 | 30 | 26 | 22 | 19 | 18 | A to C |
| 69 | C | 270 | 500 | 30 | 31 | 30 | 30 | 29 | A |
| 70 | C | 270 | 1400 | 31 | 32 | 30 | 29 | 29 | A |
| 71 | D | 380 | 300 | 30 | 27 | 22 | 17 | 18 | A to C |
| 72 | D | 380 | 500 | 29 | 28 | 26 | 27 | 25 | A |
| 73 | D | 380 | 1400 | 28 | 29 | 27 | 25 | 26 | A |
| 74 | E | 450 | 300 | 22 | 18 | 12 | 14 | 10 | C |
| 75 | E | 450 | 500 | 18 | 15 | 14 | 9 | 5 | C |
| 76 | E | 450 | 1400 | 15 | 14 | 10 | 5 | 0 | C |

As shown in Table 4, when the oil solution B, C, or D that decomposes when heated at 200 to 380° C. in an inert gas was applied (specimens 66, 67, 69, 70, 72, and 73), a long-term deterioration suppression effect was achieved (i.e., the effect of the etching treatment was maintained for a long time even in a severe storage environment) when the application amount was 500 mg/m$^2$ or more. When the oil solution B, C, or D was applied in an amount of less than 500 mg/m$^2$ (specimens 65, 68, and 71), the effect of the etching treatment was maintained for a short time. When the oil solution A that decomposes when heated at a temperature of less than 200° C. in an inert gas was applied (specimens 62 to 64), the effect of the etching treatment was maintained for a short time.

When the oil solution E that decomposes when heated at a temperature of more than 380° C. in an inert gas was applied (specimens 74 to 76), the brazability deteriorated upon application, and further deteriorated due to the dew condensation treatment. It is considered that the oil solution did not completely decompose during heating for brazing, and residual oil adversely affected brazability.

The invention claimed is:

1. An aluminum alloy brazing sheet for brazing aluminum in an inert gas atmosphere without using flux, the brazing sheet comprising a core material formed of aluminum or an aluminum alloy, a filler metal, and an intermediate material, one side or each side of the core material being clad with the filler metal through the intermediate material, the filler metal including 6 to 13 mass % of Si and 0.004 to 0.1 mass % of Li, with the balance being aluminum and unavoidable impurities, the intermediate material being formed of an aluminum alloy that consists of 0.2 to 1.3 mass % of Mg and, optionally, at least one element selected from the group consisting of 0.5 to 1.8 mass % of Mn, no more than 1.0 mass % of Si, no more than 1.0 mass % of Fe, no more than 0.5 mass % of Cu, no more than 0.5 mass % of Zn, no more than 0.2 mass % of Ti and no more than 0.5 mass % of Zr, with the balance being aluminum and unavoidable impurities, a surface oxide film having been removed from the brazing sheet, and an oil solution that decomposes when heated at 380° C. or less in an inert gas having been applied to the brazing sheet.

2. An aluminum alloy brazing sheet for brazing aluminum in an inert gas atmosphere without using flux, the brazing sheet consisting of a core material, a filler metal, and a sacrificial anode material, one side of the core material being clad with the filler metal, the other side of the core material being clad with the sacrificial anode material, the core material being formed of an aluminum alloy that includes 0.2 to 1.3 mass % of Mg, with the balance being aluminum and unavoidable impurities, the filler metal including 6 to 13 mass % of Si and 0.004 to 0.1 mass % of Li, with the balance being aluminum and unavoidable impurities, the sacrificial anode material including 0.9 to 6 mass % of Zn, with the balance being aluminum and unavoidable impurities, a surface oxide film having been removed from the brazing sheet, and an oil solution that decomposes when heated at 380° C. or less in an inert gas having been applied to the brazing sheet.

3. An aluminum alloy brazing sheet for brazing aluminum in an inert gas atmosphere without using flux, the brazing sheet comprising a core material formed of aluminum or an aluminum alloy, a filler metal, an intermediate material, and a sacrificial anode material, one side of the core material being clad with the filler metal through the intermediate material, the other side of the core material being clad with the sacrificial anode material, the intermediate material being formed of an aluminum alloy that consists of 0.2 to 1.3 mass % of Mg and, optionally, at least one element selected from the group consisting of 0.5 to 1.8 mass % of Mn, no more than 1.0 mass % of Si, no more than 1.0 mass % of Fe, no more than 0.5 mass % of Cu, no more than 0.5 mass % of Zn, no more than 0.2 mass % of Ti and no more than 0.5 mass % of Zr, with the balance being aluminum and unavoidable impurities, the filler metal including 6 to 13 mass % of Si and 0.004 to 0.1 mass % of Li, with the balance being aluminum and unavoidable impurities, the sacrificial anode material including 0.9 to 6 mass % of Zn, with the balance being aluminum and unavoidable impurities, a surface oxide film having been removed from the brazing sheet, and an oil solution that decomposes when heated at 380° C. or less in an inert gas having been applied to the brazing sheet.

4. The aluminum alloy brazing sheet according to claim 1, wherein the aluminum alloy that forms the intermediate material includes one or more elements from among 0.5 to 1.8 mass % of Mn, 1.0 mass % or less of Si, 1.0 mass % or less of Fe, 0.5 mass % or less of Cu, 0.5 mass % or less of Zn, 0.2 mass % or less of Ti, and 0.5 mass % or less of Zr.

5. The aluminum alloy brazing sheet according to claim 1, wherein the aluminum alloy that forms the core material includes 0.5 to 1.8 mass % of Mn, and one or more elements from among 1.0 mass % or less of Si, 1.0 mass % or less of Fe, 0.5 mass % or less of Cu, 0.5 mass % or less of Zn, 0.2 mass % or less of Ti, and 0.5 mass % or less of Zr, with the balance being aluminum and unavoidable impurities.

6. The aluminum alloy brazing sheet according to claim 4, wherein the aluminum alloy that forms the core material includes 0.5 to 1.8 mass % of Mn, and one or more elements from among 1.0 mass % or less of Si, 1.0 mass % or less of Fe, 0.5 mass % or less of Cu, 0.5 mass % or less of Zn, 0.2 mass % or less of Ti, and 0.5 mass % or less of Zr, with the balance being aluminum and unavoidable impurities.

7. The aluminum alloy brazing sheet according to claim 1, wherein the filler metal further includes one or more elements from among 0.004 to 0.2 mass % of Bi, 0.05 to 0.4 mass % of Mg, 0.002 to 0.05 mass % of Sr, 0.003 to 0.07 mass % of Sb, 0.05 to 0.8 mass % of Fe, 0.05 to 0.2 mass % of Mn, and 0.01 to 0.15 mass % of Ti.

8. The aluminum alloy brazing sheet according to claim 4, wherein the filler metal further includes one or more elements from among 0.004 to 0.2 mass % of Bi, 0.05 to 0.4 mass % of Mg, 0.002 to 0.05 mass % of Sr, 0.003 to 0.07 mass % of Sb, 0.05 to 0.8 mass % of Fe, 0.05 to 0.2 mass % of Mn, and 0.01 to 0.15 mass % of Ti.

9. The aluminum alloy brazing sheet according to claim 5, wherein the filler metal further includes one or more elements from among 0.004 to 0.2 mass % of Bi, 0.05 to 0.4 mass % of Mg, 0.002 to 0.05 mass % of Sr, 0.003 to 0.07 mass % of Sb, 0.05 to 0.8 mass % of Fe, 0.05 to 0.2 mass % of Mn, and 0.01 to 0.15 mass % of Ti.

10. The aluminum alloy brazing sheet according to claim 6, wherein the filler metal further includes one or more elements from among 0.004 to 0.2 mass % of Bi, 0.05 to 0.4 mass % of Mg, 0.002 to 0.05 mass % of Sr, 0.003 to 0.07 mass % of Sb, 0.05 to 0.8 mass % of Fe, 0.05 to 0.2 mass % of Mn, and 0.01 to 0.15 mass % of Ti.

* * * * *